United States Patent [19]

Wires, Sr.

[11] 4,319,146
[45] Mar. 9, 1982

[54] POWER DRIVEN EQUIPMENT SAFETY DEVICE

[75] Inventor: Charles J. Wires, Sr., Wooster, Ohio

[73] Assignee: The Will-Burt Company, Orrville, Ohio

[21] Appl. No.: 152,659

[22] Filed: May 23, 1980

[51] Int. Cl.³ .................. H02H 7/08; H02H 11/00
[52] U.S. Cl. .................... 307/328; 307/120; 241/37.5; 361/170
[58] Field of Search ............ 307/328, 120; 210/146; 241/37.5; 220/DIG. 20; 361/170

[56] References Cited

U.S. PATENT DOCUMENTS

| | | | |
|---|---|---|---|
| 2,072,681 | 3/1937 | Meeker et al. | 146/67 |
| 2,245,012 | 6/1941 | Robinson | 146/67 |
| 2,910,317 | 10/1959 | Conlee | 210/146 |
| 2,936,892 | 5/1960 | McNeil et al. | 210/146 |
| 3,734,290 | 5/1973 | Nelson | 210/146 |
| 4,105,903 | 8/1978 | Shaw et al. | 307/328 |
| 4,127,236 | 11/1978 | Lasar | 241/37.5 |

*Primary Examiner*—Joseph W. Hartary
*Assistant Examiner*—S. D. Schreyer
*Attorney, Agent, or Firm*—Frease & Bishop

[57] ABSTRACT

A safety device for power driven equipment which mechanically locks an access door on the equipment in closed position until the power drive motor has coasted to a stop. A manually operated locking bolt for the access door is pivotally mounted on a housing in which the control components for the safety device are contained. A locking plate is rigidly mounted on the pivot shaft of the locking bolt within the housing for movement with the shaft and bolt. A solenoid operated locking lever is pivotally mounted in the housing and is engageable with the locking plate when the solenoid is energized to prevent movement of the locking bolt from its door locking position. A bolt mounted on the locking plate actuates a switch which is electrically connected in the drive motor control circuit to open the circuit when the lock bolt moves to an unlocked position. A voltage sensitive relay (ZVM) maintains the control solenoid energized even after the drive motor is deenergized by the voltage produced by the back EMF of the coasting motor rotor. Therefore, only when the motor rotor becomes or approaches a stationary condition will the ZVM deenergize the solenoid which disengages the locking lever from the locking plate to permit the locking bolt to be manually moved to unlocked position for opening of the access door of the equipment.

18 Claims, 8 Drawing Figures

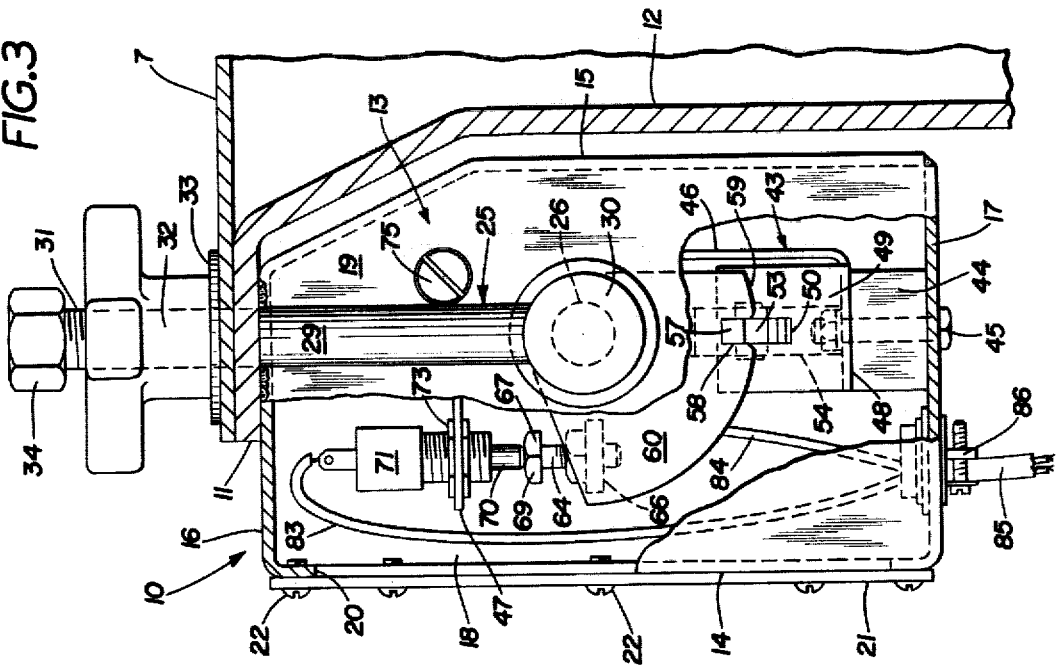

POWER DRIVEN EQUIPMENT SAFETY DEVICE

BACKGROUND OF THE INVENTION

1. Field of the Invention

The invention relates to safety devices and, in particular, to safety devices for use with power driven equipment to prevent opening of an access door on the equipment until rotation of the power driving means has stopped. More particularly, the invention relates to a safety device mounted on meat processing equipment using a solenoid operated locking latch which is controlled by a sensor that is responsive to the back EMF produced by a power drive motor upon the motor rotor approaching a stationary condition.

2. Description of the Prior Art

There are numerous type and constructions of meat processing equipment which use rotating or reciprocating knives, blades, paddles, augers or other components for cutting, slicing, chipping or conveying meat in large quantities. Examples of such equipment are shown in U.S. Pat. Nos. 3,330,318, 3,330,319, 3,599,687 and 4,127,236. Such equipment can be extremely dangerous to its operator due to the high-speed movement of the cutting members and power driven components unless sufficient safety precautions are taken. Accordingly, such equipment usually is enclosed in protective housings or cabinets which completely enclose the moving components, with access being gained thereto only by a cover, lid or door.

However, injuries still occur to the operators of such equipment since an operator will open the access door to perform maintenance on the equipment or to add or subtract the meat product from the equipment to speed production while the equipment is operating. To prevent such improper use of the equipment and the premature opening of the access door, various safety devices have been incorporated into the equipment. Magnetic switches are incorporated into the power supply circuit for the drive motor and are actuated by a permanent magnet mounted on the access door to automatically cut off the power to the drive motor upon opening of the door. Occasionally, equipment operators will bypass such magnetic switches by the placement of a permanent magnet on the switch to maintain the switch actuated even when the door is open. Also, other types of safety devices which have been incorporated into the motor control circuit of the equipment in an attempt to prevent operators from bypassing the safety device are subject to tampering by operators and do not provide a failsafe deterrent.

One problem that still persists with such equipment even if the door safety latch deenergizes the drive motor upon opening of the door, is the continued rotation of the cutting blades or other power driven elements due to the inertia or flywheel effect which remains in the rotating or reciprocating member. Thus, the cutting blade or blade carrying member could continue to move for a considerable period of time, for example, 40 to 50 seconds after the motor has been deenergized upon opening of the door. During this time period in which the rotor of the motor is coasting, an operator still can be injured if he attempts to perform work on the equipment or its contents without waiting until the motor comes to a complete stop.

U.S. Pat. Nos. 2,072,681 and 2,245,012 show a safety device for use with food processing equipment which prevents cutting knives from being driven by the motor except when the access door is closed, and in addition, prevents the equipment cover from being raised to expose the knife except when the motor is stopped. This particular safety device appears to be effective and tamperproof but involves a relatively expensive construction and requires numerous components to achieve the desired results.

U.S. Pat. No. 2,910,317 shows a safety device for a laundry machine which prevents access to the internal laundry tub during rotation of the tub by a solenoid actuated latch. The solenoid remains energized for a predetermined preset time period after the spin drive is cut off to compensate for the coast period of the motor. This type of safety device can cause problems since the time delay mechanism can be tampered with by an operator, and an exact time delay period setting may be difficult to obtain resulting in a too long or too short time delay.

U.S. Pat. No. 2,936,892 discloses another safety door latch for a washing machine using solenoid controlled switches. U.S. Pat. No. 3,734,290 shows a washing machine safety door latch which mechanically senses the tub's rotation to prevent opening of the door until the rotation has stopped. U.S. Pat. No. 4,127,236 shows still another type of safety mechanical interlock mechanism used with food processing equipment to protect the operator. However, this safety mechanism does not contain provisions for the coasting time period of the drive motor.

Therefore, the need has existed for a relatively simple, inexpensive and durable safety device which prevents opening of an access door on power driven equipment until the power drive motor has coasted to a stop, and which prevents an operator from effectively bypassing the same.

SUMMARY OF THE INVENTION

Objectives of the invention include providing an improved safety device for power driven equipment which mechanically locks the equipment access door in closed position until the power drive motor has coasted to a stop instead of enabling the door to be opened immediately after the power drive motor is deenergized, as in prior safety control devices; providing such a safety device which is contained within a housing which is mounted directly on the equipment being protected and operatively connected to one of the lid retaining bolts, enabling the device to be adaptable for use with numerous types and styles of power driven equipment without appreciably modifying the basic equipment design and construction; providing such an improved safety device which is a combination of readily available mechanical, electromechanical and solid state electronic components which are assembled into a relatively simple, sturdy and durable construction which can be incorporated into the existing electrical circuitry for the drive motor and power drive mechanism, eliminating extensive rewiring of the equipment's electrical system; providing such a safety device which uses a voltage sensitive relay such as a ZVM, which detects the back EMF produced by the rotation of the rotor of the power drive motor, and when this voltage drops below a preset level, the relay will deenergize a solenoid actuated mechanical locking mechanism located within the housing, enabling the lid locking bolt to be moved manually to an unlocked position; providing such an improved safety device which cannot be readily bypassed by an operator as in prior power driven equipment safety devices, and which can be incorporated with a magnetic lid switch of the type used in many existing safety devices; providing such a safety device in which the voltage sensitive relay can also control other equipment simultaneously upon being deenergized when the back EMF voltage drops below the preset minimum; providing such a safety device which contains a control switch connected in the power supply circuit for the drive motor which is separate from the manually actuated "stop" and "start" switches which can only be closed to provide power to the main drive motor when the mechanical locking bolt is in a lid locking position which prevents premature starting of the drive motor; providing such a safety device in which the voltage sensitive relay is a ZVM (zero voltage monitor) which senses the rotation of the main drive motor directly, eliminating the manual setting of a timer or time delay mechanism, as in prior safety devices; and providing such an improved safety device which eliminates difficulties heretofore encountered, achieves the stated objectives simply and effectively, and solves problems and obtains new results in the art.

These objectives and advantages are obtained by the improved safety device which is adapted for use with power driven equipment to prevent opening of an access door on said equipment until electrically driven power driving means in the equipment has reached a predetermined speed. The general nature of said safety device may be stated as including protective housing means adapted to be mounted in the equipment closely adjacent the access door, sensor means mounted in the housing means and operative in response to the rotation of the power driving means reaching a predetermined speed, bolt means mounted on the housing means and adapted to engage the access door of the power driven equipment and to move between door locked and unlocked positions, solenoid means mounted within the housing means and operated by the sensor means in response to the power driving means reaching the predetermined rotational speed, and lever means mounted within the housing means and movable into and out of locking engagement with the bolt means by the solenoid means, with said lever means preventing movement of the bolt means from locked to unlocked position when the solenoid is energized by the sensor means.

BRIEF DESCRIPTION OF THE DRAWINGS

A preferred embodiment of the invention—illustrative of the best mode in which applicant has contemplated applying the principles—is set forth in the following description and shown in the drawings, and is particularly and distinctly pointed out and set forth in the appended claims.

FIG. 2 is an enlarged fragmentary front view of the improved safety device, with portions broken away and in section;

FIG. 3 is a fragmentary sectional view taken on line 3—3, FIG. 2, with portions of the side wall of the safety device housing broken away and in section;

Similar numerals refer to similar parts throughout the drawings.

DESCRIPTION OF THE PREFERRED EMBODIMENT

Figure 1:
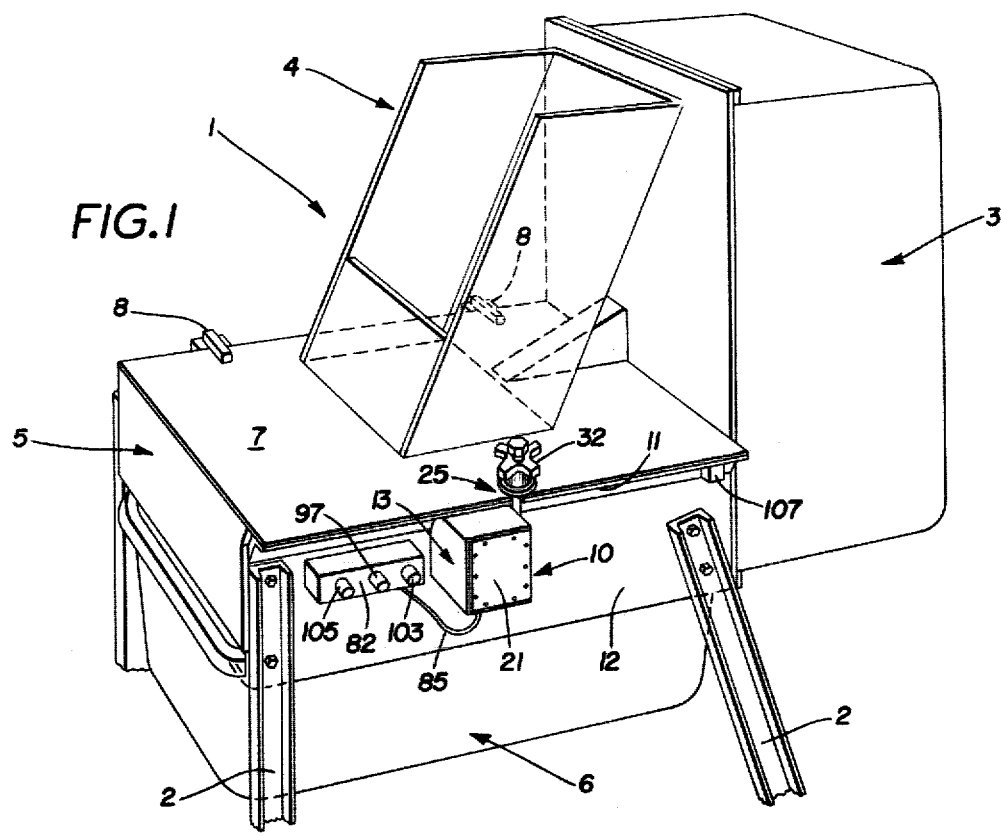
FIG. 1 is a fragmentary perspective view showing the improved safety device mounted on a power driven food processing piece of equipment.

A particular type of power driven equipment on which the improved safety device is intended for use is shown in FIG. 1, and is indicated generally at 1. Equipment 1 is a frozen meat block chipping apparatus of the type shown in U.S. Pat. No. 3,330,319 and is generally referred to as a meat chipper. Chipper 1 includes as main components a plurality of usual supporting leg members 2, a drive chamber 3, a feed hopper 4, a cutting chamber 5 and a meat chip container 6 which is removably mounted beneath cutting chamber 5. A plurality of rotary or reciprocating cutting knives or blades are located within cutting chamber 5, and are driven by a driving motor and associated power transfer mechanism, which is located within drive chamber 3. The details of these components may be of the construction shown and described in detail in the above-mentioned U.S. Pat. No. 3,330,319 and, therefore, are not shown or repeated herein.

Large blocks of frozen or semifrozen meat are fed into cutting chamber 5 through feed hopper 4 where they are cut or chipped into predetermined sized meat chips which are collected in meat container 6. Container 6 then is slidably removed from beneath cutting chamber 5 and the chips removed from the container for further processing depending upon the particular end use of the meat.

The top of cutting chamber 5 is closed by a cover or lid 7 which is hingedly connected to the cutting chamber by spaced hinges 8. Lid 7 is retained in a closed position, as shown in FIG. 1, by the improved safety device, which is indicated generally at 10.

Figure 7:
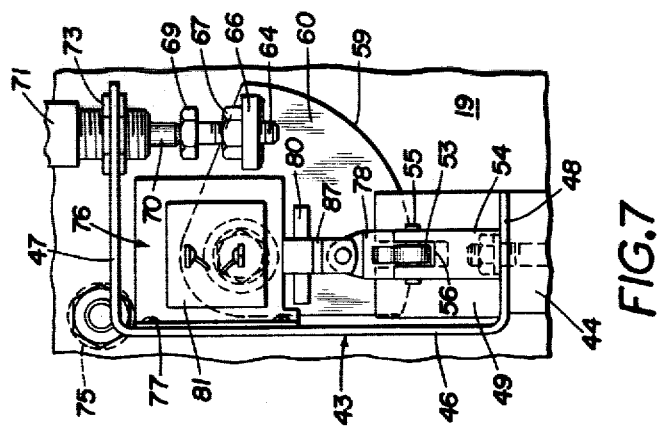
FIG. 7 is a fragmentary sectional view taken on line 7—7, FIG. 2.

Safety device 10 is welded beneath a horizontally extending flange 11 which projects outwardly from the top of a side wall 12 of cutting chamber 5. Device 10 is shown in assembled condition in FIGS. 2-4, with specific portions being shown in detail in FIGS. 5-7. Device 10 includes a protective metal housing 13 which is formed by spaced front and rear walls 14 and 15, top and bottom walls 16 and 17, and side walls 18 and 19. Front wall 14 is formed with a rectangular-shaped opening 20 which provides access to the interior of housing 13, and is closed by a cover plate 21. Plate 21 is removably mounted on housing 13 by screws 22 or other types of fasteners which would deter entrance into the interior of the housing by unauthorized personnel to prevent tampering with the safety mechanism located therein.

Figure 5:
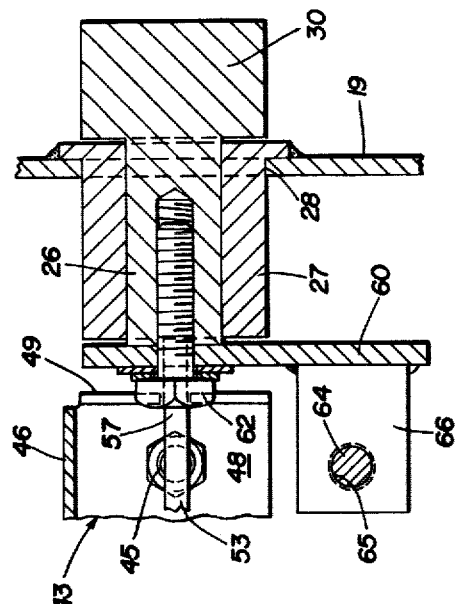
FIG. 5 is an enlarged fragmentary sectional view taken on line 5—5, FIG. 2.
Figure 6:
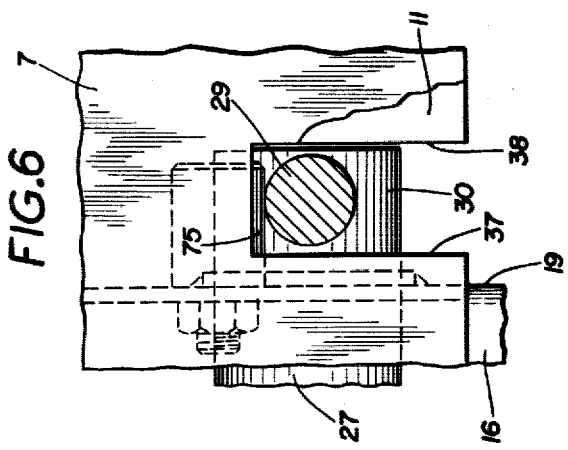
FIG. 6 is an enlarged fragmentary sectional view taken on line 6—6, FIG. 2.

A lid locking bolt, indicated generally at 25, is pivotally mounted on side wall 19 of housing 13 by a horizontally extending pivot shaft 26 (FIGS. 2 and 5). Shaft 26 is telescopically, rotatably mounted in a bushing 27, which is press fitted or welded in an opening 28 formed in housing side wall 19. Locking bolt 25 further includes a bolt shaft 29 which is attached to an enlarged cylindrical end 30 of pivot shaft 26. Shaft 29 terminates in a threaded upper end 31 having a locking nut 32 threadedly adjustably mounted thereon. A washer 33 is telescopically mounted on bolt shaft 29 below locking nut 32. A retaining nut 34 is welded to the top of thread shaft end 31 to prevent removal of locking nut 32 and washer 33 from shaft 29 of locking bolt 25.

Shaft 29 of locking bolt 25 is adapted to be received within horizontally extending, vertically aligned slots 37 and 38 formed in the outer end of chipper lid 7 and in side wall top flange 11, respectively, when bolt 25 is in the lid locking position. When shaft 29 is located within slots 37 and 38, an operator is prevented from raising lid 7 from its closed position due to its engagement with nut 32 and washer 33. During a meat chipping operation, nut 32 will clamp washer 33 tightly against lid 7, in turn tightly clamping lid 7 against side wall top flange 11 to secure lid 7 in a closed position. Even if nut 32 is loosened, lid 7 cannot be sufficiently raised to gain access into cutting chamber 5 when bolt 25 is in a vertical position because of the engagement of lid 7 with nut 32 and washer 33.

Many types of power driven equipment, such as meat chipper 1, are provided with a locking bolt similar to bolt 25 for retaining the lid in a securely closed position during operation of the equipment. This locking bolt is usually pivotally mounted on a stud or similar component beneath the lid on a side wall of the equipment and is received within a slot or bracket opening provided on the lid. Therefore, safety device 10 can be mounted on existing equipment with lid locking bolt 25 replacing the existing locking bolt. This eliminates any appreciable modification or reconstruction of the equipment when mounting improved safety device 10 thereon.

The improved safety device 10 further includes a U-shaped bracket, indicated generally at 43 (FIGS. 4 and 7) which is mounted within housing 13 by a mounting block 44, which is attached to housing bottom wall 17 by a pair of bolts 45. Bracket 43 includes a vertically extending wall 46 and horizontally, outwardly extending top and bottom bracket legs 47 and 48. Mounting block bolts 45 extend through bracket leg 48 for mounting bracket 43 on block 44. One end of bracket leg 48 is provided with an upturned, vertically extending flange 49 having a vertically extending slot 50 formed in the top thereof.

A locking lever 53 is pivotally mounted on a post 54 which is mounted on and extends upwardly from bracket leg 48. One end of lever 53 is pivotally mounted by a pin 55 in a slot 56 formed in the top end of post 54. Swinging end 57 of lever 53 is adapted to move vertically into and out of a slot 58 formed in the outer arcuate edge 59 of a locking plate 60. Plate 60 has a configuration resembling a sector of a circle and is rigidly attached to pivot shaft 26 of bolt 25 by a bolt 62 (FIG. 5) so as to rotate with shaft 26 upon the pivotal movement of locking bolt shaft 29.

A switch actuator bolt 64 is adjustably mounted in a threaded hole 65 which is formed in a shelf 66. Shelf 66 is welded on locking plate 60 and projects perpendicularly generally horizontally, outwardly therefrom. A locking nut 67 secures actuator bolt 64 in a predetermined adjusted position on shelf 66. Head 69 of actuator bolt 64 engages a plunger 70 of a switch 71 when locking bolt 25 is in the lid locking position (FIGS. 2 and 3). Switch 71 is mounted on bracket leg 47 of U-shaped bracket 43 by a pair of locking washers 73. A stop 75 is mounted on housing side wall 19 and projects horizontally outwardly therefrom and is engaged by locking bolt shaft 29 when bolt 25 is in a vertical position, as shown in FIGS. 2 and 3, to properly position shaft 29 within slots 37 and 38. Also, stop 75 positions slot 58 of locking plate 60 in alignment with slot 50 of bracket 49 and with lever end 57 when locking bolt 25 is in its vertical position for receiving swinging end 57 therein.

A solenoid, indicated generally at 76, is attached by a plurality of screws 77 to vertical wall 46 of U-shaped bracket 43. Solenoid 76 is operatively connected to locking lever 53 at a point between swinging end 57 and pivot pin 55, as shown in FIG. 2, by a clevis 78 and associated attachment pin 79. Metal core 80 which moves axially within coil 81 of solenoid 76 is connected to clevis 78 by a bracket 87 for pivotally moving lever 53 into and out of locking engagement with plate 60.

Electrical circuit control wires 83 and 84 are connected to the terminals of switch 71 and solenoid 76, respectively, and exit housing 13 by a conduit 85 which is attached by a clamp 86 to housing bottom wall 17. Conduit 85 is connected to a control box 82 which is mounted on side wall 12 of cutting chamber 5. Manually actuated "start" and "stop" buttons 105 and 103, respectively, are housed within and project outwardly from box 82. An additional manual control button 97 also may be mounted within and project outwardly from control box 82 for controlling other components of chipper 1, such as a hopper "raise" and "lower" mechanism or similar component.

In accordance with one of the features of the invention, a rotational sensing device which monitors rotation of the drive motor for the power drive system is operatively connected with the control mechanism described above and shown in the drawings. The particular motor rotor sensing device used is a voltage sensitive relay (ZVM) indicated generally at 90. ZVM 90 may be mounted within control box 82 or other convenient portion of the electrical control circuit, such as in drive chamber 3. One type of ZVM which may be used is distributed by R. K. Electric Co., Inc. of Cincinnati, Ohio, and is designated as a ZVM-600N and described particularly in its design application bulletin DA-1 dated February, 1976.

Figure 8:
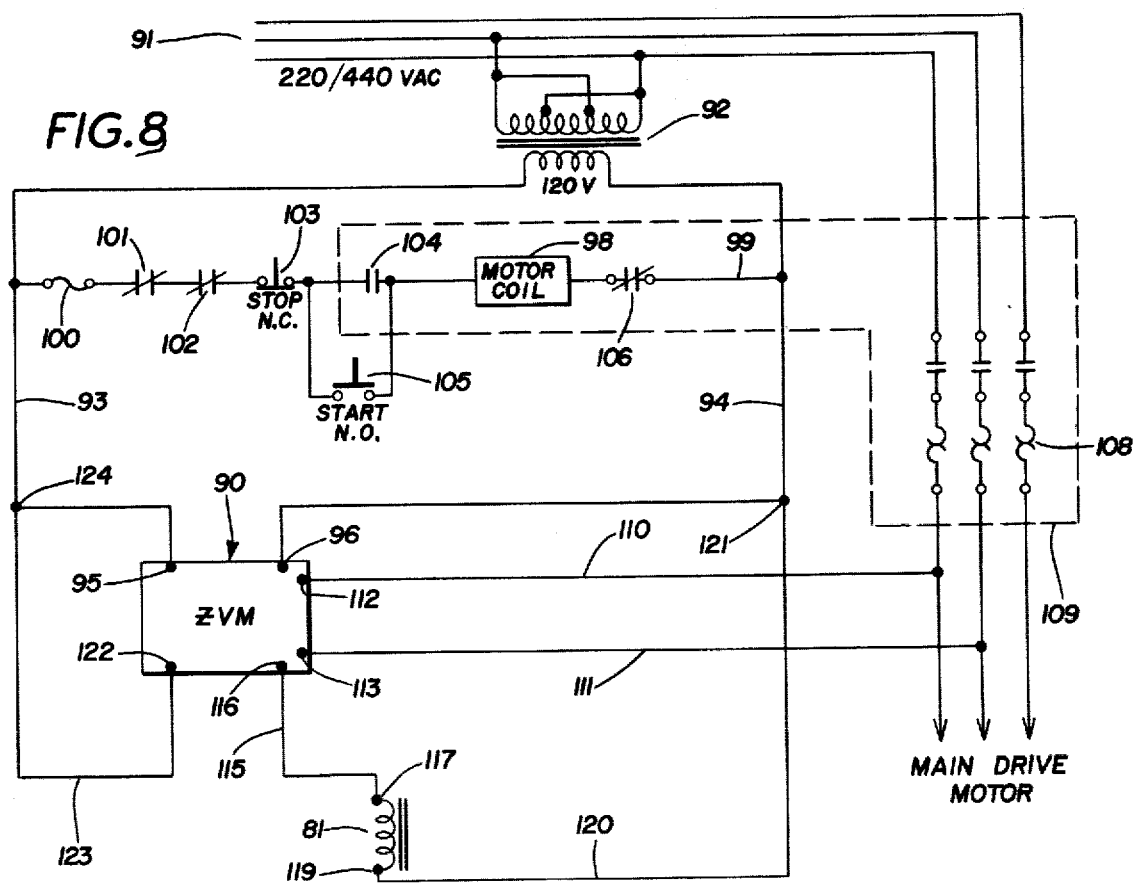
FIG. 8 is a schematic electrical wiring diagram of the improved safety device incorporated with the power supply of the drive motor.

ZVM 90 is a voltage sensitive relay which senses in the millivolt range the back EMF which is produced by a usual induction motor when it operates both under normal operating conditions and when it acts as a generator during rotor coasting. Thus the ZVM or voltage sensitive relay will be maintained in a predetermined position, either normally open or normally closed, when a voltage signal is supplied thereto by the back EMF created by the rotating induction motor rotor until the generated signal (voltage) drops to an extremely low preset millivolt level. This level is reached when the rotor is stationary, or preferably just prior to the rotor becoming stationary. FIG. 8 shows the particular circuitry in which ZVM 90 is incorporated for controlling improved safety device 10.

Referring to FIG. 8, a usual incoming electrical supply line 91 supplies low voltage power for the electrical control system of chipper 1 through a transformer 92. The transformer secondary supplies the required AC power input to sensor 90 through lines 93 and 94 which are attached to sensor 90 at terminals 95 and 96, respectively. Coil 98 of the power drive motor is connected in parallel across the secondary coil of transformer 92 by a line 99. Connected in series in line 99 is a usual protection fuse 100, normally closed contacts 101 of a magnetically operated lid switch 107 which is mounted on side wall flange 11 (FIG. 1), contacts 102 of lock bolt actuated switch 71, manually operated "stop" switch 103, contacts 104 of manually operated "start" switch 105, and normally closed thermal overload contacts 106. Overload contacts 106 are operated by thermal overload elements 108 located in the drive motor control mechanism located generally within the area enclosed by dash lines 109 of FIG. 8.

The input signal or voltage which is supplied to sensor 90 by the back EMF produced by the rotating motor rotor, is supplied through lines 110 and 111 which are connected to sensor 90 at terminals 112 and 113, respectively. The output of sensor 90, which is dependent upon the position of the internal relay, is applied to a line 115 which is connected to sensor 90 at terminal 116. Sensor output line 115 is connected to one terminal 117 of coil 81 of solenoid 76, with the other coil terminal 119 being connected by a line 120 to transformer secondary line 94 at a junction 121. Common terminal 122 of sensor 90 is connected by line 123 to line 93 at junction 124.

The operation of improved safety device 10 is described below. Upon the start of a meat chipping operation, lid 7 will be in the closed position of FIGS. 1, 2, 3 and 6, with lock bolt 25 being in its locked position in which shaft 29 extends in a vertical direction and is located within slots 37 and 38 of lid 7 and top wall flange 11. Lock nut 32 will be advanced downwardly, clamping washer 33 tightly against lid 7, in turn clamping lid 7 against top wall flange 11 of side wall 12. When in the locked position of FIGS. 2 and 3, actuator bolt 64 depresses switch plunger 70, which closes contacts 102. Also, contacts 101 of power supply line 99 will be closed since magnetic switch 107 will be actuated by a permanent magnet (not shown) which is carried by lid 7, when the magnet comes into close proximity with switch 107 when the lid is closed.

Referring to FIG. 8, an operator will manually depress start button 105, which in turn closes contact 104, which completes the circuit to motor coil 98 through line 99. Contacts 106 are normally closed, and will remain closed unless actuated by thermal overloads 108. The power drive motor then is energized and begins operation of the various meat chipping mechanisms or other equipment intended to be driven by the motor.

Immediately upon motor coil 98 being energized, the motor rotor will begin rotating, which applies the voltage that is produced by the back EMF of the motor on terminals 112 and 113 of sensor 90. This applied voltage actuates the internal relay of sensor 90 completing a circuit therethrough which energizes solenoid coil 81 through line 115. Immediately upon coil 81 being energized, solenoid core 80 moves upwardly within coil 81 pivotally moving locking lever 53 upwardly, which moves swinging end 57 into slot 58 of locking plate 60, which prevents rotation of locking bolt 25. Even if bolt 32 is loosened from its lid clamping position, attempted pivotal movement of bolt 25 will be prevented by the engagement of lever end 57 in locking plate slot 58. The edges of bracket flange 49 which define bracket slot 50, prevent any excess bending moment from being applied to locking lever 53 should an individual attempt to force locking bolt 25 in a downward pivotal movement when locking lever 53 and locking plate 60 are operatively engaged.

Upon completion of a chipping operation, an operator will manually actuate stop button 103, which breaks the circuit supplying power to motor coil 98 through line 99. In accordance with one of the main features of the invention, locking bolt 25 will continue to secure lid 7 in its closed position until the rotor of the drive motor has come to a complete or nearly complete stop. The back EMF which is produced by the coasting motor rotor due to the generator action thereof continues to maintain solenoid coil 81 energized through the closed internal relay of sensor 90. Locking lever 53 remains in its locking engagement with slot 58 of locking plate 60 so long as coil 81 is energized, preventing pivotal movement of bolt 25 from its locked position.

When the voltage produced by the back EMF of the coasting rotor reaches a predetermined level, for example, forty millivolts or less, the sensor relay will operate, deenergizing coil 81. Locking lever 53 will drop downwardly from its full line locking position, as shown in FIG. 2, to its unlocked dot-dash line position. This enables an operator to pivotally move locking bolt 25 from its locked position of FIGS. 2 and 3 to the unlocked position of FIG. 4, whereupon lid 7 can be pivoted upwardly to permit access to the interior of cutting chamber 5.

Figure 4:
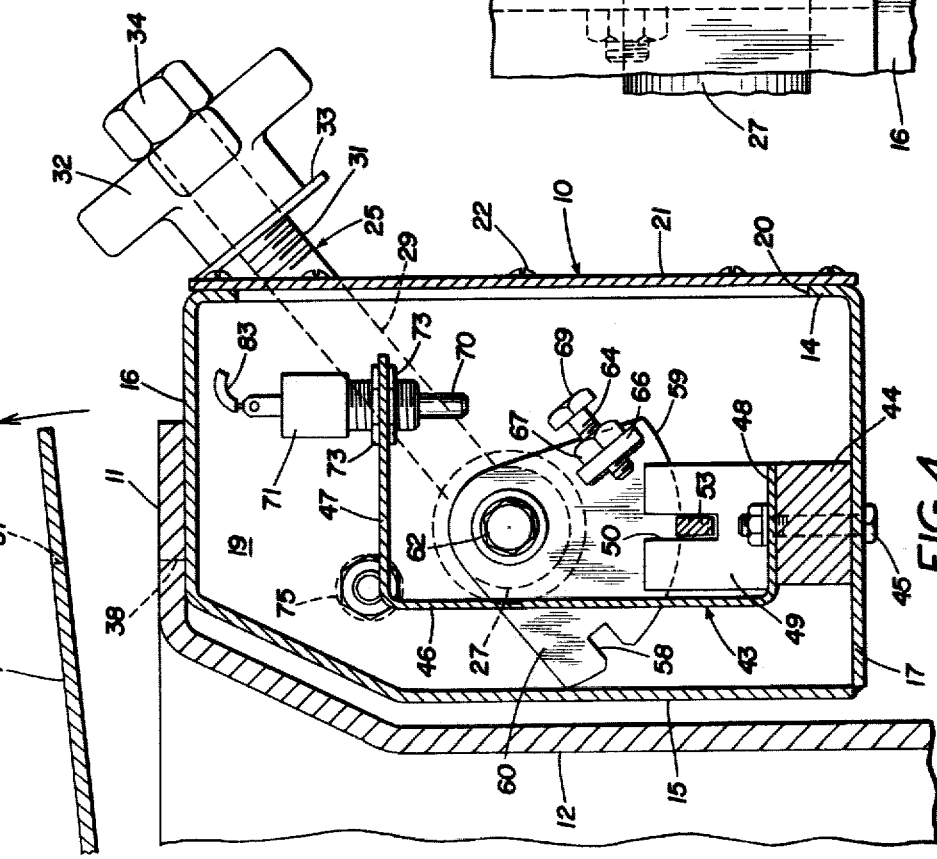
FIG. 4 is a fragmentary sectional view taken on line 4—4, FIG. 2, with the locking bolt being shown in unlatched position, with the lid of the power driven equipment being in a partially open position.

Movement of locking bolt 25 to the unlocked position of FIG. 4 disengages actuator bolt 64 from plunger 70 of switch 71 opening contacts 102 in the motor coil control line 99. Also, immediately upon raising of lid 7, magnetic switch 107 opens switch contacts 101 in line 99 since the perrmanent magnet which is mounted on the lid is moved out of proximity from switch 107. Thus, when lid 7 is raised, operation of "start" button 105 will not energize motor coil 98 since both contacts 101 and 102 are open. Furthermore, should an operator place a permanent magnet adjacent magnetic switch 107 when lid 7 is in a raised position, which will close contacts 101, motor coil 98 still cannot be energized since contacts 102 of switch 71 remain open until the switch plunger 70 is depressed. Plunger 70 can only be depressed when lock bolt 25 is in its vertical locked position. This prevents restarting of the drive motor when safety device 10 is in the unlocked position.

Sensor 90 is set to deenergize or operate its internal relay upon the applied voltage reaching a predetermined minimum level, such as 40 millivolts, instead of waiting until the motor rotor comes to a complete stop. This extremely low voltage condition will only occur just seconds before the rotor comes to a complete stop. A longer time period will be required before an operator can pivot locking bolt 25 between locked and unlocked positions and raise lid 7. Therefore, the cutting knives or blades in chamber 5 will be completely stopped prior to lid 7 being raised a sufficient amount for an operator to place his hand into chamber 5.

Another advantage of improved safety device 10 is the ability to control other equipment by the voltage sensitive relay of sensor 90 simultaneously upon the operation of the relay. The relay used in the particular ZVM set forth above, is a double pole-double throw relay. Thus, another control circuit, such as for a conveyor system for feeding blocks of frozen meat into hopper 4, may be connected to the other poles of the relay. When the signal voltage drops below the preset level and operates the sensor relay to deenergize solenoid 81, the relay will energize the conveyor drive motor, feeding another block of meat into hopper 4 for subsequent chipping when the drive motor is reenergized. Accordingly, when the chipper drive motor is reenergized, the sensor relay will be operated and energize solenoid 81 and deenergize the conveyor drive circuit. Various other equipment or components could be operated accordingly in response to operation of the voltage control relay of sensor 90.

The use of the ZVM sensor is preferred over other types of sensing devices since it senses rotation of the main drive motor. However, it can be replaced by any one of a number of known timers, which are operated pneumatically, hydraulically, electronically or by a clock. However, the delay time setting of such timers must be calibrated so that it exceeds the coasting time of the particular motor, which may be difficult to accurately set and which can be tampered with by an operator to circumvent the built-in safety feature.

Accordingly, the improved safety device provides a relatively simple, efficient, safe, inexpensive and effective mechanism which achieves all of the enumerated objectives, provides for eliminating difficulties encountered with prior safety devices, solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the safety device for power drive equipment is constructed and used, the characteristics of the construction, and the advantageous, new and useful results obtained; the new and useful structures, devices, elements arrangements, parts, and combinations, are set forth in the appended claims.

I claim:

1. A safety device adapted for use with equipment to prevent opening of a door on said equipment to gain access to a compartment containing a power driven mechanism until an AC induction motor which drives said mechanism approaches zero rotational speed, said device including:
   (a) a protective housing adapted to be mounted on the equipment closely adjacent the access door;
   (b) sensor means operative in response to a predetermined back EMF produced by the rotational speed of the induction motor;
   (c) bolt means mounted on the housing means and engageable with the access door of the power driven equipment and movable between door locked and unlocked positions for preventing opening of the access door until the rotational speed of the induction motor approaches zero;
   (d) a solenoid mounted within the housing and operated by the sensor means upon the rotational speed of the motor and back EMF thereof approaching zero; and
   (e) lever means mounted within the housing means and movable into and out of locking engagement with the bolt means by the solenoid means, said lever means being in locking engagement with the bolt means preventing movement of the bolt means from locked to unlocked position until the rotational speed of the motor approaches zero, whereupon the solenoid means is operated by the sensor means and moves the lever means out of locking engagement with the bolt means permitting the bolt means to be moved from locked to unlocked position.

2. The safety device defined in claim 1 in which the bolt means includes a horizontal pivot shaft extending through a wall of the housing, a locking shaft extending radially outwardly from one end of the pivot shaft outside of said housing, and a locking plate mounted on the other end of the pivot shaft within the housing; and in which the locking plate is engaged by the lever when the solenoid means is energized to retain the bolt means in locked position.

3. The safety device defined in claim 2 in which the locking plate is formed with a slot; and in which the lever means is pivotally mounted at one end and has an opposite swinging end which is engaged in the slot of the locking plate when the solenoid is energized to prevent movement of the bolt means.

4. The safety device defined in claim 3 in which the locking plate has a configuration similar to the sector of a circle with a curved edge portion; and in which the slot is formed in the curved edge portion.

5. The safety device defined in claim 2 in which the locking shaft of the locking bolt means has a threaded outer end; and in which a nut is adjustably mounted on the threaded outer end and is adapted to clampingly engage the access door.

6. The safety device defined in claim 5 in which means is mounted on the threaded outer end of the locking shaft preventing removal of the clamping nut from said threaded end.

7. The safety device defined in claim 1 in which switch means is mounted within the protective housing and is operated by the bolt means when said bolt means moves between door locked and unlocked positions to enable the induction motor to be connected to and disconnected from a supply of electric power.

8. The safety device defined in claim 1 in which stop means is mounted on the housing and is engageable by the bolt means when the bolt means is in the door locking position to align the lever means with the bolt means for locking engagement therebetween.

9. The safety device defined in claim 1 in which the sensor means is a ZVM which contains a voltage sensitive relay; and in which the relay is operated upon the back EMF which is produced by the rotation of the induction motor dropping to a predetermined level as the rotation of the motor approaches zero.

10. In an improved power driven piece of equipment of the type having an electric drive motor, a work performing mechanism located within a compartment of the equipment and driven by the electric motor, a door providing access into the compartment, and electric circuit means operatively connecting the drive motor to a supply of electric power, wherein the improvement includes safety latch means mounted on the equipment and engageable with the access door to prevent access into the mechanism compartment until the drive motor is stationary, said safety latch means including:
   (a) bolt means mounted on the equipment and engageable with the access door, said bolt means being movable between locked and unlocked positions with respect to said access door;
   (b) sensor control means including a voltage sensitive relay operatively connected with the electric circuit means and responsive to the back EMF voltage produced by the drive motor;

(c) solenoid means connected with said electric circuit means and controlled by the sensor control means, with said solenoid means being energized in relationship to the back EMF voltage produced by the rotation of the drive motor; and (d) lever means movable into locking engagement with the bolt means upon energization of the solenoid means when the bolt means is in locked position to maintain the bolt means in locked position with the access door until rotation of the drive motor approaches zero, whereupon the sensor control means deenergizes the solenoid means to move the lever means out of locking engagement with the bolt means.

11. The improved power driven equipment defined in claim 10 in which the bolt means includes a pivotally mounted locking shaft having a threaded upper end, and a stub shaft pivotally mounting said locking shaft on the equipment; in which opening means is formed in the access door for receiving the locking shaft therein when the bolt means is in locked position; and in which a nut is mounted on the threaded end of the locking shaft for clamping engagement with the access door when the locking bolt is in said locked position.

12. The improved power driven equipment defined in claim 11 in which a locking plate is mounted on the stub shaft of the bolt means for rotation with said stub shaft; and in which the lever means engages the locking plate when the solenoid means is energized to lock said plate and connected locking shaft in a door locked position.

13. The improved power driven equipment defined in claim 12 in which the lever means includes a lever pivotally mounted adjacent one end with an opposite swinging end engageable with the locking plate; in which the solenoid means includes a movable core which is connected to the lever; and in which the swinging end of the lever is moved into locking engagement with the locking plate upon movement of the solenoid core when the solenoid is energized.

14. The improved power driven equipment defined in claim 13 in which first switch means is operatively connected with the electric circuit means and is operated by the bolt means when the bolt means moves between locked and unlocked positions; and in which said first switch means is in a closed position when the bolt means is in the locked position enabling the drive motor to be operatively connected to the supply of electric power.

15. The improved power driven equipment defined in claim 10 in which the electric circuit means includes a magnetic switch which is closed when the access door is in a closed position to enable the drive motor to be operatively connected to the supply of electric power.

16. The improved power driven equipment defined in claim 10 in which the sensor control means is a ZVM which includes the voltage sensitive relay.

17. The improved power driven equipment defined in claim 10 in which manually operated drive motor "start" and "stop" switches are operatively connected in the electric circuit means to enable the drive motor to be operatively connected to and disconnected from the supply of electric power.

18. In an improved power driven piece of equipment of the type having an AC electric induction drive motor, a work performing mechanism located within a compartment of the equipment and driven by the induction motor, a door providing access into the compartment, and electric circuit means operatively connecting the drive motor to a supply of electric power, wherein the improvement includes safety latch means mounted on the equipment and engageable with the access door to maintain the door in a locked condition and prevent access into the mechanism compartment until the drive motor is almost stationary, said safety latch means including:

(a) bolt means mounted on the equipment and engageable with the access door for preventing opening of said door until the drive motor is almost stationary;

(b) sensor control means operatively connected with the electric circuit means and bolt means for maintaining the bolt means in locking engagement with the access door until the back EMF voltage produced by the rotation of the rotor of the induction drive motor approaches zero;

(c) solenoid means operatively connected with said electric circuit means and bolt means and controlled by the sensor control means for maintaining the bolt means in locking engagement with the access door, said solenoid means being maintained energized until the back EMF voltage produced by the rotation of the drive motor approaches zero; and (d) lever means maintained in locking engagement with the bolt means by the solenoid means when the bolt means is in locked position and the solenoid means is energized to maintain the bolt means in locked position with the access door until rotation of the drive motor approaches zero, whereupon the back EMF of said motor approaches zero and the sensor control means in response to the EMF approaching zero deenergizes the solenoid means moving the lever means out of locking engagement with the bolt means permitting the bolt means to be moved to unlocked position with respect to the access door.

* * * * *